(12) United States Patent
Einecke et al.

(10) Patent No.: US 11,188,679 B2
(45) Date of Patent: Nov. 30, 2021

(54) METHOD AND SYSTEM FOR PRIVACY COMPLIANT DATA RECORDING

(71) Applicant: HONDA RESEARCH INSTITUTE EUROPE GMBH, Offenbach/Main (DE)

(72) Inventors: Nils Einecke, Offenbach (DE); Stefan Fuchs, Offenbach (DE); Andreas Richter, Offenbach (DE); Christiane Knorz, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 368 days.

(21) Appl. No.: 16/255,053

(22) Filed: Jan. 23, 2019

(65) Prior Publication Data
US 2019/0228182 A1    Jul. 25, 2019

(51) Int. Cl.
| G06F 21/62 | (2013.01) |
| G06T 11/60 | (2006.01) |
| G06F 21/60 | (2013.01) |
| G06K 9/00 | (2006.01) |
| G06K 19/07 | (2006.01) |

(52) U.S. Cl.
CPC ........ *G06F 21/6254* (2013.01); *G06F 21/602* (2013.01); *G06F 21/604* (2013.01); *G06K 9/00288* (2013.01); *G06K 19/0723* (2013.01); *G06T 11/60* (2013.01)

(58) Field of Classification Search
CPC .. G06K 9/00288; G06K 19/072; G06T 11/60; G06F 21/6254; G06F 21/602; G06F 21/604

USPC .......................................................... 726/30
See application file for complete search history.

(56) References Cited

U.S. PATENT DOCUMENTS

| 6,580,574 B1 * | 6/2003 | Codilian ................ G11B 19/04 360/60 |
| 2007/0192910 A1 * | 8/2007 | Vu ........................... B25J 19/06 700/245 |
| 2007/0296817 A1 | 12/2007 | Ebrahimi et al. |
| 2009/0202114 A1 * | 8/2009 | Morin .................... A63F 13/213 382/118 |

(Continued)

FOREIGN PATENT DOCUMENTS

KR    10-2015-0127498    11/2015

OTHER PUBLICATIONS

NPL Search History (Year: 2021).*

(Continued)

*Primary Examiner* — Syed A Zaidi
(74) *Attorney, Agent, or Firm* — Squire Patton Boggs (US) LLP (57) ABSTRACT

The invention regards a method and system for recording observation data without violating privacy. Environment is sensed and observation data including information on the sensed environment is generated. The observation data is processed for determining presence of one or more persons in the sensed environment. Those person(s) amongst the present person(s) that did not agree to store their private data are identified and privacy compliant observation data is generated by obfuscating the private data of these persons. The privacy compliant observation data is store for later use.

30 Claims, 3 Drawing Sheets

(56) References Cited

U.S. PATENT DOCUMENTS

| | | | |
|---|---|---|---|
| 2012/0106806 A1* | 5/2012 | Folta | G06K 9/00295 382/118 |
| 2014/0176663 A1 | 6/2014 | Cutler et al. | |
| 2014/0201126 A1* | 7/2014 | Zadeh | A61B 5/165 706/52 |
| 2016/0019415 A1* | 1/2016 | Ra | G06K 9/6247 382/197 |
| 2016/0132719 A1* | 5/2016 | Fithian | G06F 16/5866 345/647 |

OTHER PUBLICATIONS

Hotta, Kazuhiro. "A robust object tracking method under pose variation and partial occlusion." IEICE transactions on information and systems 89.7 (2006): 2132-2141. (Year: 2006).*

Aditya, Paarijaat, et al. "I-pic: A platform for privacy-compliant image capture." Proceedings of the 14th annual international conference on mobile systems, applications, and services. 2016. (Year: 2016).*

NPL Search Terms (Year: 2021).*

Sadeh, Norman, et al. "Understanding and capturing people's privacy policies in a mobile social networking application." Personal and Ubiquitous Computing 13.6 (2009): 401-412. (Year: 2009).*

Jagtap, Pramod, et al. "Preserving privacy in context-aware systems." Semantic Computing (ICSC), 2011 Fifth IEEE International Conference on. IEEE, 2011. (Year: 2011).*

European Search Report dated Jul. 16, 2018 corresponding to European Patent Application No. 18152972.8.

Paarijaat Aditya et al., "I-Pic: A Platform for Privacy-Compliant Image Capture," Mobile Systems, Applications and Services, ACM, Jun. 20, 2016, pp. 235-248, XP05859714.

Junjue Wang et al., "A Scalable and Privacy-Aware IoT Service for Live Video Analytics," Proceedings of the 8th ACM on Multimedia Systems Conference, Jun. 20, 2017-Jun. 23, 2017, pp. 38-49, XP055490399.

* cited by examiner

METHOD AND SYSTEM FOR PRIVACY COMPLIANT DATA RECORDING

BACKGROUND

Field

The invention regards a method and a system that is capable of performing privacy compliant data recording in mixed scenarios, where a person agrees or disagrees to recording private data.

Description of the Related Art

Nowadays, video data is recorded in many places by many different devices. This data may be recorded for surveillance reasons by surveillance cameras for example. Naturally, such surveillance systems generate image data on which persons and their behaviour can be easily recognized. Other applications of video data that is generated on an environment of some particular object, may be used for realizing special functions like lane detection or traffic light detection in a car for advanced driver assistance systems. However, also other devices of our daily life use video data to increase a user's comfort. An example could be a Smartphone or any other device, which is unlocked when a face recognition algorithm indicates that the true owner of the device requests for unlocking.

Often, it is possible to hold the data in a volatile memory and to process the data on the basis of the volatile memory only. This is for example the case for the unlocking routine, where the data is relevant only until the device is unlocked. Afterwards, the data can be deleted from the device. Of course, this is different for video data, which is generated for surveillance reasons. Here, it might be interesting to record the data and store the data in a non-volatile memory. However, also for improving functionalities, it would be helpful to store data as especially new deep learning techniques need a large amount of data for training.

Since information on persons may be derived from such stored data, it is obvious that some people do not want to have their private data be recorded. As long as the video data observes only one person at a time, like for example the user of a Smartphone, this user may give his consent to data recording at any time. However, there are other situations, where a plurality of persons make use of the same object, for example a room of a so-called "smart house" or at least a "smart room". Here, it is not only one person that has to be asked for his consent to private data recording, but a plurality of different persons because these different persons might potentially be recorded, even at the same time. In many cases, these persons are not even known in advance, for example visitors.

Usually, strict rules are used to ensure that data of a person are not recorded. For example, US 2007/0296817 A1 describes a system, where sensitive image parts are encrypted before the data is transmitted or recorded. However, there is no distinction made between a person, who gave his consent and a person that for example actively expressed his disagreement to private data recording.

Another approach is disclosed for example in US 2014/0176663 A1. Here, the video communication system assumes that a person in the foreground of an image is interested in transmitting his image, but that all other persons that might be visible in the background have no such interest and thus, all the background information is obfuscated.

All these approaches have the problem that an individual consent that is given by a person may not be considered at all and thus, the possibility to use information from environment observation is very limited.

SUMMARY

It is thus an object of the present invention to provide the broadest possible database of observation data without violating privacy of persons.

The object is achieved by the method and system according to the independent claims. Advantageous aspects are defined in the dependent claims.

According to the present invention, an area of an environment is sensed by one or a plurality of sensors. The observation data that is generated by the one or plurality of sensors includes information on the sensed environment and thus may also include information on persons. According to the invention, persons that are present in the observed environment are determined and those persons amongst the persons that are observed, who did not agree to record their private data, are identified. In order to determine the presence of persons and to identify the persons, a microprocessor is used to process the observation data. From the observation data, the microprocessor further generates privacy compliant observation data by obfuscating private data of the persons, who did not agree to record their private data. Finally, the privacy compliant observation data is stored so that it is available for later analysis or a deep learning algorithm for example. The big advantage of the present invention is that not all private data, which can be identified within for example a captured image, needs to be deleted, obfuscated or encrypted, but only the data of a person who did not agree and thus give consent to recording their private data. In particular in systems that make use of surveillance cameras for example where a plurality of different persons may be present at a time or in time sequence, this drastically increases the amount of data that can be used for later processing. Coming back to the example of smart rooms or rooms in smart houses, this means for example that a sensor that perceives a person in a room can provide valuable information for improving systems. On the other side the privacy of persons who do not want to have their private data being exploited or further processed is still respected.

The observation data in particular includes at least one of a captured still image or a captured moving image, an audio file, and metadata derived from the originally obtained sensor data. Such metadata may be for example movement patterns or persons. For the explanation given below it will always be referred to the example of image capturing but it is evident that the same principles may be applied to audio data or metadata as well.

In case that the observation data is image data including at least one critical area, the privacy compliant information is generated by obfuscating this critical area or a plurality of critical areas that are identified within the image. A critical area is an area in an image that comprises privacy relevant information which may be for example a face of a person, the entire person or a number plate of a vehicle which is driven by a person or, more generally, any information that allows direct or indirect identification of a person. The obfuscation is done for example by blurring the critical area, performing a randomized pixel exchange within the critical area, replacing pixels of the critical area by black pixels or by white pixels, performing a face replacement using a predetermined substitution face or by replacing pixels of the critical area by background pixels. Of course, also a combination of the different modes of obfuscation is possible.

It is in particular advantageous if the environment sensing is performed using a plurality of cameras. If the system comprises a plurality of cameras and all these plurality of cameras simultaneously capture images (either still images, a series of still images or a moving image) simultaneously, it is possible to replace the critical area in an image by background pixels which are captured at the same time by another camera. In case the cameras are calibrated a position of a critical area within an image captured by one camera can be transformed into position information in an image captured by another one of the plurality of cameras. This allows to obfuscate a corresponding area in an image of another camera, too. Further, background pixels, occluded in one image can be extracted based on such position information. This has in particular the advantage that if a replacement of pixels of a critical area by background pixels is performed, always pixels with a close time relation can be used. When for example the ambient lights change over the time of the day, nevertheless the impression of homogeneous illumination is maintained.

It is in particular preferred to identify persons by a face recognition algorithm. An advantageous example for such face recognition algorithm uses a neural network that transforms faces into a high-dimensional vector and the distance of the high-dimensional vectors from new faces are compared to a set of reference vectors of trained faces. The use of such neural network has the advantage that a high recognition rate can be achieved. Further, in case that a person gave his consent to recording or storing the private data, the high-dimensional vector describing the face of this person can be stored.

On the other hand, it is advantageously possible to store a low-dimensional binary vector for persons who expressly disagreed to storing their private data instead of their actual face image. This approach ensures that persons who disagreed to recording of their private data nevertheless can be automatically identified but reverse engineering such low-dimensional binary vector is an ill-posed problem and thus, privacy of the respective person is maintained. Otherwise, such persons would need to be asked every time when they appear in an image and are determined to be a person unknown to the system. Thus, the reduction of dimension of the vector and recording such vector allows to distinguish between people that have been asked and disagreed and people that are completely unknown to the system because they never appeared before.

It is preferred to obfuscate private data of persons that expressly disagreed but also of persons that cannot be identified at all. Thus, only data of persons who are positively identified as persons that gave their consent is not obfuscated and thus their private data may be recorded. This ensures that without violating the privacy of any person the system can automatically act.

It is furthermore possible and improves security even more when not an actual binary vector is stored but a classifier or cluster algorithm (for example k-means) is trained on all binary vectors or faces from people that have disagreed to the recoding. The reverse engineering as mentioned above is thus even harder. The effort to reverse engineer a single face will increase with the number of people face vectors trained. Furthermore, such classifier or cluster algorithm using the binary vectors from people who announced their disagreement allows to distinguish between people who disagreed and people which are completely unknown to the system. This gives the chance to ask the people who are not known at all whether they agree that their private data is recorded or not. Thus, the data base which is stored in a non-volatile memory and holds the binary vectors of people who disagreed and the face vectors of people who agreed can be enhanced continuously. Together with the information that in fact a person agreed to recording of data, of course, the settings for such recording can be more fine-grained. It is in particular possible to store preferences of an individual person, for example that the person agreed to following the trajectories and recordation thereof but that the person did not agree to store clear camera frames. In that case the images can be obfuscated in that critical region of such person even though the person generally agreed to recording private data.

It is particularly advantageous to store the reference vectors on RFID devices. In that case no person specific data is stored outside the RFID which is under control of the person and may be accessed only by the time necessary to perform face recognition by the microprocessor.

According to another advantageous embodiment, the environment sensing includes capturing a series of images and identification of persons which are then tracked over the plurality of images of the series. This allows that a correct identification and association of any person that is determined in a captured image may be achieved, even in case that the actual image does not show the face which is used for recognition and identification of a person. The tracking may be performed backward in time or forward in time. But in particular the backward tracking allows to properly obfuscate or record data for a person that at the time an earlier image was captured could not be said to have agreed or disagreed. After the face became visible for the first time in a later image and thus the face recognition process or algorithm could be performed it is then possible to act correctly on the private data of this person.

The preferences or privacy settings which have been mentioned above already allow in particular to store second level data like a movement or a trajectory. But still in such a case it is ensured that the stored or recorded data does not allow direct inference of a specific person.

In order to enhance the data base it is advantageous that every time an identification of a person cannot be performed this person is asked to expressly agree or disagree to private data storing.

According to another advantageous aspect of the invention the processing that has been mentioned above is done on a volatile memory only. This means that all the observation data which is generated by the one or plurality of sensors is held in a volatile memory and all processing on this data, the obfuscating and the generation of the privacy compliant data is all performed on this volatile memory. Only the generated privacy compliant data is then written into and recorded in a non-volatile memory. This approach ensures that even in case of a power failure no private data is stored in the non-volatile memory unless the person to which the private data belongs had given his consent before. Data which is not yet obfuscated at that point in time is held only in the volatile memory and thus gets lost in case of a power failure.

According to a further advantageous aspect, the system also comprises an RFID (radio-frequency identification) device such an NFC (near field communication) card for example, which the person that for example uses a smart room carries with him. Such RFID device may for example be used in an access control system, so that a person using the smart room necessarily carries the RFID device with him. The card is issued to the person when the person achieves access permission to the smart room and at that point in time the person may also be asked to agree or disagree to private data recordation. The respective information can be stored on the RFID device and whenever somebody enters the controlled room the system recognizes the person by means of the key card and, thus, knows whether the data recording is allowed or not. In such systems where controlled access is used it is particularly advantageous to use a dedicated camera for entrance observation. This ensures that identification of a person may be achieved immediately upon entering a room.

BRIEF DESCRIPTION OF THE DRAWINGS

Advantageous aspects of the invention will become even more apparent from the description which is given below and which is based on the annexed drawings. In the drawings

DETAILED DESCRIPTION

Figure 1:
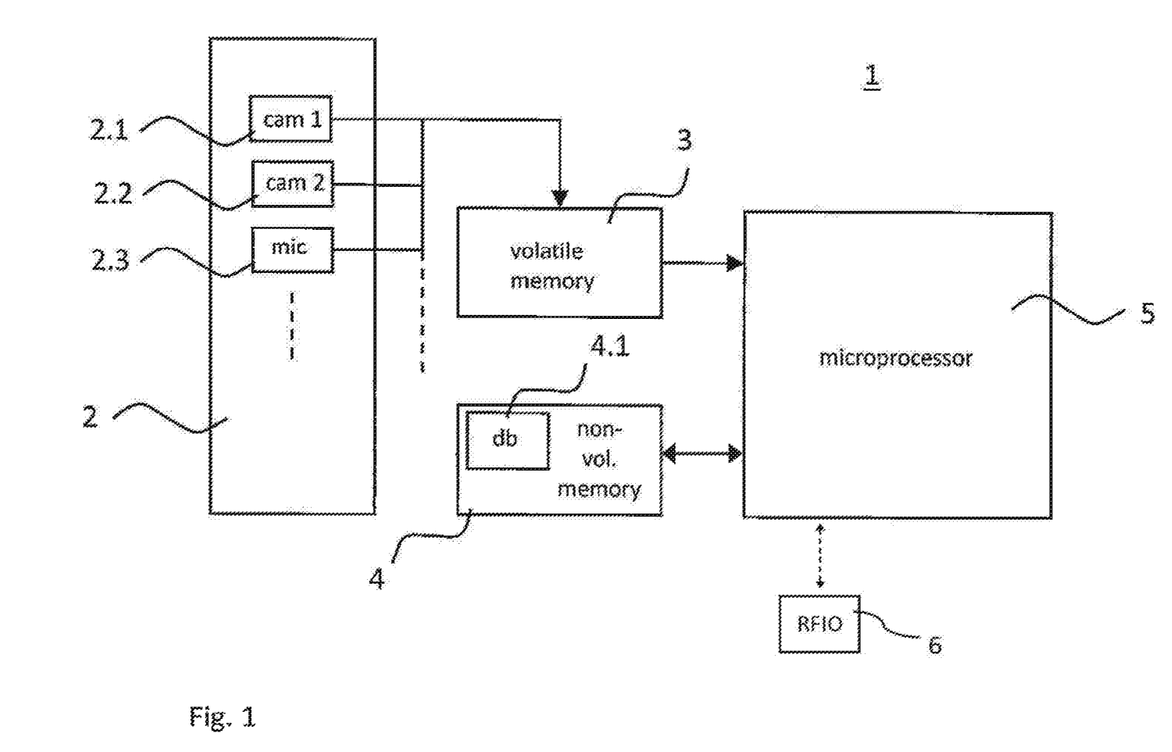
FIG. 1 shows a block diagram of the inventive system.

FIG. 1 shows a block diagram of a system 1 for carrying out the inventive method. The system 1 comprises at least one sensor unit 2, in the present case comprising a plurality of sensors 2. The plurality of sensors 2 may in particular comprise a first camera 2.1, a second camera 2.2 and a microphone 2.3. The coverage of camera 2.1 and camera 2.2 is such that the observed areas at least partially overlap. Such overlapping of the observed areas is particularly advantageous in order to share information on a critical area to be obfuscated, but also in order to determine the pixels of the background that can be used in order to replace pixels of a critical area in an image captured by another camera. The latter will be explained in more detail with respect to FIG. 3. Sharing information enables to obfuscate a critical area in images of a plurality of cameras based on position transformation.

As in the introductory portion, mentioned already, the explanation that will be given below is made on the example of images captured by a single camera or a plurality of cameras, in particular, captured moving images forming the observation data. However, any other signal that is generated by one or a plurality of sensors 2, which is suitable for identifying an individual person, may be used instead. An obvious example is an audio file, which is created using microphone 2.3 and which captures, for example, the voice of a person, which is also characteristic for this particular person.

The observation data, which is generated by the sensor unit 2 is transmitted to a volatile memory 3. The volatile memory 3 holds the observation data as long as it needs for entirely processing the data by a microprocessor 5. The microprocessor 5 is responsible for all observation data processing of the data generated by the sensor unit 2, but also to generate and record in a non-volatile memory 4 privacy compliant data, which is generated by the process, which will be described hereinafter. As it will be explained in the following in greater detail, the microprocessor 5 generates privacy compliant data, which selectively obfuscates private data only of persons that did not give their consent to record their private data. By doing so, for example a moving image that might include either at the same time or in time sequence a plurality of different persons may be recorded, where only data of persons is obfuscated, which did not give their consent to record their private data. On the other side, all the details that are allowed to be recorded by a person are stored in full detail in the non-volatile memory 4.

The non-volatile memory 4 furthermore stores a database 4.1 where reference vectors used for identification of a person are stored. Thus, when in the volatile memory 3 observation data is present and by a determination algorithm performed in the microprocessor 5, it is determined from the data that a person is present in an image a face recognition is performed. In order to perform such face recognition, preferably by an artificial neutral network is used. Such network is pre-trained to transform faces into a lower dimensional space represented by a bit string. The learned transformation is enforced to transform same faces under different views to the same bit string and different faces to different bit strings. Thus, already a single image of a face is enough to post train a face recognition. It is only required to store a bit string of the face for later comparison to other face bit strings for recognition. So this bit string is stored in the database 4.1 and when a person is identified in a new image, a comparison with this bit string is performed by the microprocessor.

It is to be noted that the database 4.1 in addition to the pure bit string of course stores identification information for the person and may advantageously store privacy settings or preferences of the person. These privacy settings (or preferences) may be retrieved by the microprocessor 5 from the database 4.1 and may be used in order to correctly obfuscate the private data or parts thereof. For example, in case that a person generally gave his consent to record private data, nevertheless, the person might have chosen not to record detailed image data. Thus, the area of the image in a face might be blurred by the microprocessor 5 before the data is stored in the non-volatile memory 4.

It is further to be noted that the data that is stored in the database 4.1, in particular the reference vector (face vector) or bit string, could alternatively be stored on an RFID device 6. In that case, the microprocessor 5 has to perform communication with the RFID device 6 in order to obtain the respective information like the reference vector but also privacy settings, identification information or the like. In case that a person that shall be identified has no RFID device with him or more general, the RFID is not accessible, the person will be treated as being unknown to the system. The advantage of storing at least the reference vector of the RFID device is that the rest of the system, namely the non-volatile memory 4 and here in particular the database 4.1, does not store any person specific data at all. For conciseness of the description of the invention, it is assumed that the database 4.1 is used for storing the reference vector and other information, but it is evident that all explanations given below similarly are true for a system including the RFID device 6 with the microprocessor 5 being abled to communicate (store and retrieve data) with the RFID device 6.

Before the images are stored finally in the non-volatile memory 4, critical areas in the image data are obfuscated. Such obfuscation may include blurring of the critical area but also randomly exchanging pixels of the area within the critical area, replacing pixels within the critical area by only black pixels or only white pixels or a pattern consisting of black and white pixels. Another approach is that in case that the critical area is the face of a person, this critical area is replaced by a predetermined substitution face could for example be a standard face or an artificial face which is also stored in non-volatile memory 4. Finally, the pixels of the critical area can also be replaced by pixels taken from a background image. The background pixels that correspond to the critical area on the one hand could be taken from another image captured by the same camera 2.1 or 2.2 at a point in time where this area was not occluded by the identified person. On the other side, the background pixels could be extracted from an image taken by another camera, in particular at the same point in time.

For the explanation given, it is assumed that the critical area is always the face. However, the critical area could be part any part of the image that enables direct or indirect identification, for example a number plate.

Figure 2:
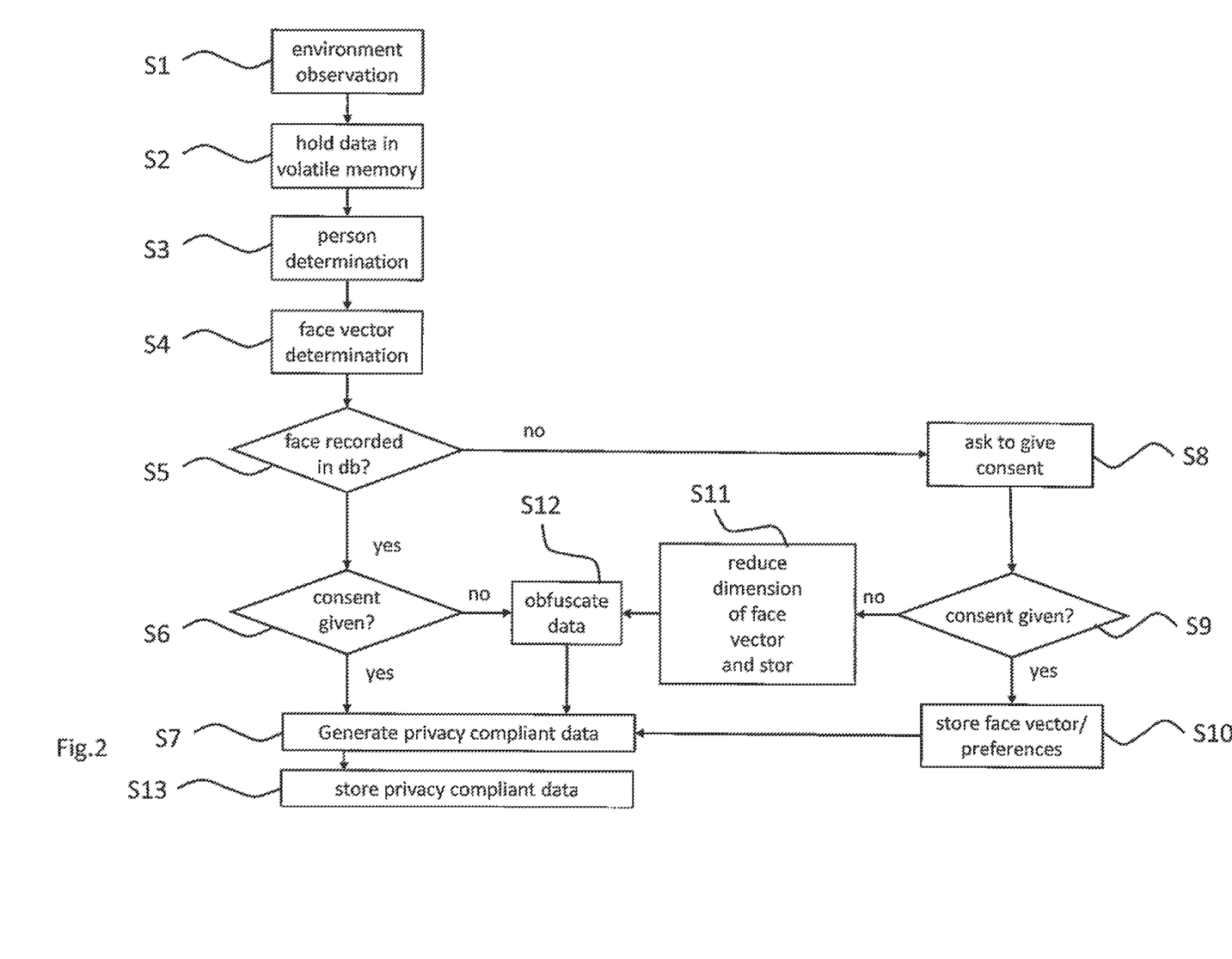
FIG. 2 shows the main method steps in a flowchart.

FIG. 2 shows a simplified flowchart of the invention. As mentioned above, the environment observation in step S1 is performed by the sensor unit 2 and all of the available sensors 2. These sensors 2 may be for example a plurality of sensors 2 that are used in a smart room and can comprise a camera being directed to a sofa in front of a TV screen. In case that in the image captured by the camera it is detected that a person takes seat in the sofa, the TV might be switched on automatically.

In order to allow processing of the observation data, the observation data generated by the sensor unit 2 is held in the volatile memory 3 in step S2. On the volatile memory 3 the processing by microprocessor 5 is performed in order to determine a person or a plurality of persons in the observation data held in the volatile memory 3. The person determination is performed in step S3 and in case that a person is determined in the observation data, face vector determination is performed according to a preferred embodiment in step S4 to identify the person. Face vector determination per se is well known in the art and preferably uses a high-dimensional face vector.

As it was explained above already, face vectors of persons who already declared their consent or their disagreement to recording private data are stored in the database 4.1 (or on the RFID 6). By comparison of the determined face vector of a determined person with the stored face vectors it is possible to determine if the now observed face is already recorded in the database in step S5.

When the result of such comparison is that the face is recorded already in the database 4.1, it is further determined if the person associated with the face vector has given his consent to recordation of private data. When this determination in step S6 is positive, meaning the person agreed to recording private data, the observation data is maintained unchanged for generating the privacy compliant data.

Contrary, when the face is not recorded in the database 4.1, this means that the person is not known to the system 1 at all, the person is asked to give consent to recording of private data in step S8. Thereafter it is determined in step S9 if the person in fact has given his consent. If yes, the face vector and optionally any preferences or privacy settings is stored in step S10 in the database 4.1.

Of course, a person who is asked to agree to recordation of private data may also expressly disagree to such recordation. If in step S9 it is thus input into the system 1, for example by a user interface, that consent is not given, the method proceeds to step S11. In that case a dimension of the face vector is reduced and the face vector with the reduced dimension is stored in the data base 4.1. Storing such dimensionally reduced face vector ensures that reverse engineering is almost impossible and thus even if the system security is violated it is not possible to identify a particular person. On the other side when a person is determined to be present in a captured image it is still possible to determine whether this specific person previously was already asked for consent to data recording. Repetitive requests can thus be avoided and the person is not bothered.

After the face vector has been reduced in dimension and the reduced face vector has been stored in the data base 4.1 the private data relating to this person is obfuscated in step S12. This obfuscated data is then used to generate the privacy compliant data in step S7 which is stored as mentioned in step S13.

It is evident that for a single image or a specific sequence of images there may be a plurality of persons present at the same time. Of course, the recordation of the privacy compliant data is performed only in the end. For every person individually first the related portion of data is obfuscated, if necessary. In the case of agreement this means that the private data of the person is treated as set in the privacy settings and for disagreement the relevant private data is obfuscated by either of the methods indicated above. Finally an image is generated with privacy compliant data where different critical areas corresponding to different persons are all treated as agreed or not agreed to by the person and the entire image including the probably differently treated critical areas is then recorded in the non-volatile memory 4 in step S13.

Figure 3:
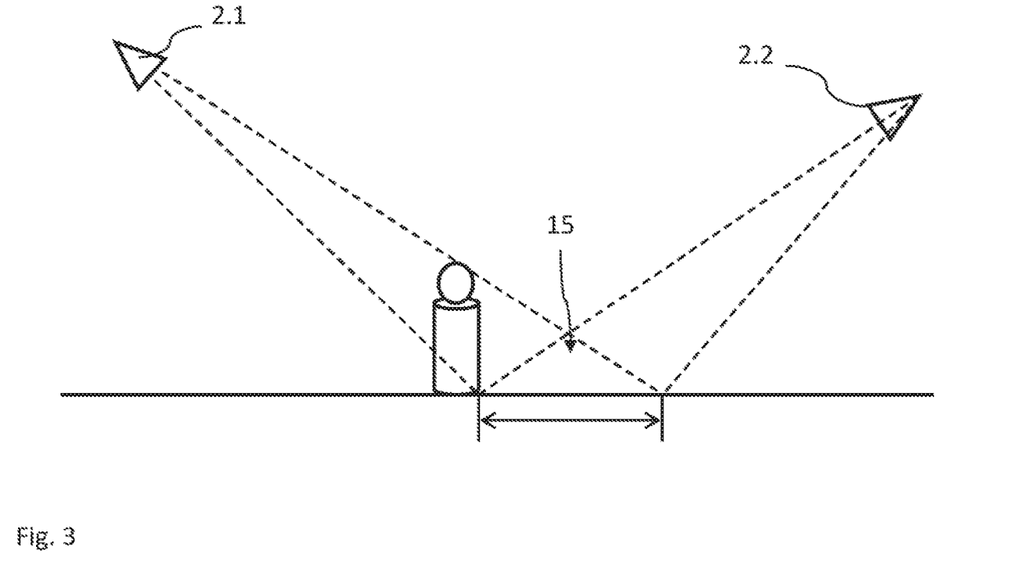
FIG. 3 illustrates extraction of pixels for replacement of a critical area by background pixels.

FIG. 3 shows an example how to determine background pixels that shall be used for replacing a critical area in an image taken by camera 2.1. Camera 2.1 and camera 2.2 are directed to areas that at least partially overlaps. A person 6 is standing in the room and thus from the view point of camera 2.1 occludes a certain area of the floor 15 indicated by the arrow. As the cameras 2.1 and 2.2 are calibrated, a position transformation of an area in the image of camera 2.1 can be made to the image of camera 2.2. Thus, based on the position information obtained in the image of camera 2.1 it is possible to determine the corresponding pixels in the image of camera 2.2. These pixels will then be used to replace the respective pixels of the critical area in the image of camera 2.1. But also obfuscation of the person's face in the image of camera 2.2 can be made based on such position transformation.

Figure 4:
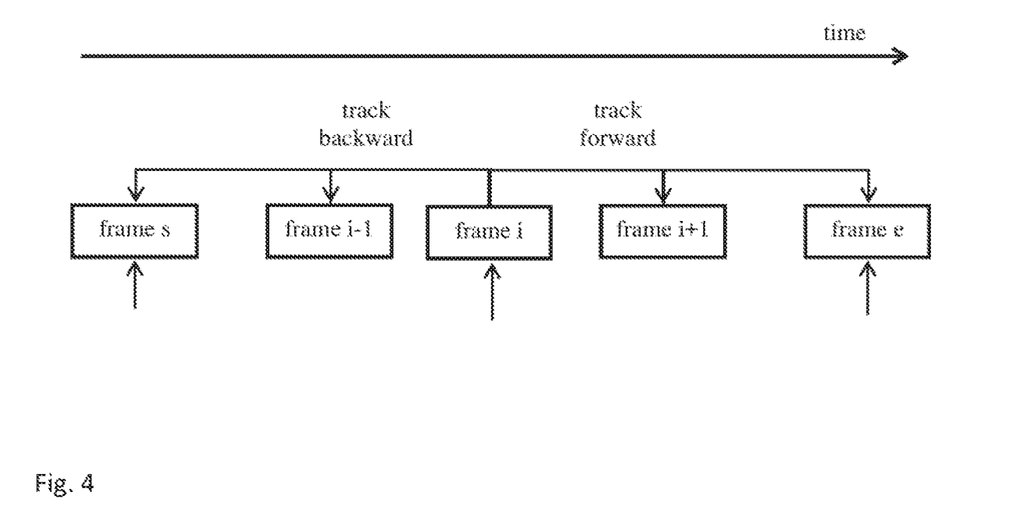
FIG. 4 illustrates a backward and forward tracking.

Finally, FIG. 4 shows a simple schematic in order to illustrate the forward and backward tracking. Along the time line a plurality of images (frames) is captured by at least one camera. The simplified example mentions only four consecutive images s, i−1, i, i+1 and e. In frame s already a person can be determined to be present. Nevertheless, an identification of the person cannot be performed because face recognition is impossible. This might be the case if for example the camera is oriented in such a way that the person can be captured only from behind. In the example, only when frame i is captured the person already turned around such that face recognition can be performed. Then, by tracking back this person who was visible all the time in the different frames the identified person can be associated with a person visible in frames s and i−1 as well. Thus, even if the face is visible only in frame i and it is then determined that the person entirely disagreed to recordation of any of the private data allowing to somehow identify the person, obfuscation of data could be performed in all even in the first frame when the person was identified. Therefore, in case a person is determined to be present, but is not identifiable, the frames will be maintained in the volatile memory 3.

On the other side forward tracking which is started from frame i allows to directly identify a determined person without the need of repetitive execution of the face recognition.

As mentioned above, the invention is particularly suitable for application in smart rooms or camera enhanced devices.

But of course, the general principle can be applied to any device or system that allows to generate data from an environment observation including information on individual persons.

The invention claimed is:

1. A method for recording observation data without violating privacy, the method including:
   sensing environment and generating observation data including information on the sensed environment;
   processing the observation data for determining presence of one or more persons in the sensed environment;
   identifying those person(s) amongst the present person(s) that did not agree to storing their private data;
   generating privacy compliant observation data by obfuscating the private data of such persons; and
   storing the privacy compliant observation data, wherein
   the observation data include a captured still or moving image including at least one critical area, such critical area is an image area comprising privacy relevant information,
   the environment sensing is performed using a plurality of cameras, and
   the cameras are calibrated such that a position of a critical area within the image captured by one camera can be transformed to a position in an image captured by another one of the plurality of cameras and, based on such position transformation, obfuscation is performed by replacing at least pixels of the critical area by background pixels extracted from at least one image captured by the other camera.

2. The method according to claim 1, wherein the observation data further includes at least one of an audio file and meta data derived from originally obtained sensor data, in particular a movement pattern.

3. The method according to claim 1, wherein persons are identified by face recognition.

4. The method according to claim 3, wherein for face recognition a neural network is used transforming images of faces into a high-dimensional vector and the distance of the high-dimensional vectors from new faces are compared to a set of reference vectors of trained faces.

5. The method according to claim 4, wherein a reference vector describing a face is stored for each person who gave consent to storing person related data.

6. The method according to claim 4, wherein the reference vector of a person who gave consent is stored in an RFID device.

7. The method according to claim 4, wherein for persons that expressed that they disagree to private data storing a low dimensional binary vector is stored.

8. The method according to claim 7, wherein obfuscation of private data is performed on data of persons that expressly disagreed and persons that cannot be identified at all.

9. The method according to claim 7, wherein for persons who disagreed on private data storing a representative vector is generated.

10. The method according to claim 1, wherein the environment sensing includes capturing a series of images and identified person are tracked over the series of images (frame s, frame i−1, frame I, frame i+1, frame e).

11. The method according to claim 10, wherein tracking is performed backward in time.

12. The method according to claim 1, wherein depending on privacy settings second level data, which is data that does not allow direct inference of a specific person, is stored.

13. The method according to claim 1, wherein persons that cannot be identified at all are asked to expressly agree or disagree to private data storing.

14. The method according to claim 1, wherein observation data is held in a volatile memory and data processing including obfuscation is done on the volatile memory and storing of privacy compliant data is done on the non-volatile memory.

15. The method according to claim 1, wherein information on consent to private data storing is stored on an RFID device.

16. A system for recording observation data without violating privacy, the system comprising:
   a plurality of cameras for sensing environment and generating observation data including information on the sensed environment;
   a microprocessor processing the observation data configured to determine presence of one or more persons in the sensed environment, identify those person(s) amongst the present person(s) that did not agree to storing their private data, and to generate privacy compliant observation data by obfuscating the private data of these persons; and
   a memory to store the privacy compliant observation data, wherein
   the observation data include a captured still or moving image including at least one critical area, such critical area is an image area comprising privacy relevant information,
   the cameras are calibrated such that a position of a critical area within the image captured by one camera can be transformed to a position in an image captured by another one of the plurality of cameras, and
   the microprocessor is configured to perform, based on such position transformation, obfuscation by replacing at least pixels of the critical area by background pixels extracted from at least one image captured by the other camera.

17. The system according to claim 16, wherein the system further includes a sensor that is a microphone.

18. The system according to claim 16, wherein the microprocessor is configured to identify persons by face recognition.

19. The system according to claim 18, wherein for face recognition a neural network is used transforming images of faces into a high-dimensional vector and the distance of the high-dimensional vectors from new faces are compared to a set of reference vectors of trained faces.

20. The system according to claim 19, wherein the microprocessor is configured to store a reference vector describing a face for each person who gave consent to storing person related data.

21. The system according to claim 20, wherein the system is configured to allow the microprocessor communication with an RFID device to retrieve from and store a reference vector on the RFID device.

22. The system according to claim 20, wherein the microprocessor is configured to generate for persons who disagreed on private data storing a representative vector.

23. The system according to claim 19, wherein the microprocessor is configured to generate and store for persons that expressed that they disagree to private data recording a low dimensional binary vector.

24. The system according to claim 23, wherein the microprocessor is configured to perform obfuscation of private data on data of persons that expressly disagreed and persons that cannot be identified at all.

25. The system according to claim 16, wherein the environment sensing includes capturing a series of images and identified person are tracked over the series of images (frame s, frame i−1, frame I, frame i+1, frame e).

26. The system according to claim 25, wherein the microprocessor is configured to perform tracking backward in time.

27. The system according to claim 16, wherein the microprocessor is configured to store, depending on privacy settings, second level data, which is data that does not allow direct inference of a specific person.

28. The system according to claim 16, wherein persons that cannot be identified at all are asked to expressly agree or disagree to private data storing.

29. The system according to claim 16, wherein the system comprises a volatile memory and the microprocessor is configured to perform data processing including obfuscation on the volatile memory and to store privacy compliant data in a non-volatile memory.

30. The system according to claim 16, wherein the system comprises a RFID device and information on consent to private data storing is stored on an RFID device.

\* \* \* \* \*

UNITED STATES PATENT AND TRADEMARK OFFICE
CERTIFICATE OF CORRECTION

PATENT NO. : 11,188,679 B2
APPLICATION NO. : 16/255053
DATED : November 30, 2021
INVENTOR(S) : Nils Einecke et al.

Page 1 of 1

It is certified that error appears in the above-identified patent and that said Letters Patent is hereby corrected as shown below:

On the Title Page

In Item (30):
Please add the Foreign Application Priority Data, as follows:
--Jan. 23, 2018 (EP) .............................18152972--

Signed and Sealed this
Twenty-fifth Day of March, 2025

Coke Morgan Stewart
*Acting Director of the United States Patent and Trademark Office*